United States Patent
Wei et al.

(10) Patent No.: US 7,579,764 B2
(45) Date of Patent: Aug. 25, 2009

(54) FIELD EMISSION ELECTRON SOURCE HAVING CARBON NANOTUBE

(75) Inventors: Wei Wei, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 330 days.

(21) Appl. No.: 11/514,596

(22) Filed: Sep. 1, 2006

(65) Prior Publication Data

US 2007/0236126 A1    Oct. 11, 2007

(30) Foreign Application Priority Data

Apr. 5, 2006    (CN) ................. 2006 1 0060186

(51) Int. Cl.
*H01J 1/304* (2006.01)
*H01J 1/05* (2006.01)

(52) U.S. Cl. .................. 313/311; 313/310; 313/495

(58) Field of Classification Search ......... 313/495–497, 313/309–311; 445/50, 51
See application file for complete search history.

(56) References Cited

U.S. PATENT DOCUMENTS

| 6,504,292 | B1  | 1/2003  | Choi et al. |
| 2005/0116214 | A1 | 6/2005 | Mammana et al. |
| 2005/0260453 | A1* | 11/2005 | Jiao et al. .................... 428/698 |
| 2006/0097615 | A1* | 5/2006 | Tsakalakos et al. ......... 313/309 |

FOREIGN PATENT DOCUMENTS

| JP | P2005-63802 A | 3/2005 |
| JP | P2006-247832 A | 9/2006 |

* cited by examiner

*Primary Examiner*—Karabi Guharay
(74) *Attorney, Agent, or Firm*—D. Austin Bonderer

(57) ABSTRACT

A field emission electron source (10) includes a conductive base (12), a carbon nanotube (14), and a modifying layer (16). The conductive base includes a top (122). One end (142) of the carbon nanotube is electrically connected with the top of the conductive base. The other end (144) of the carbon nanotube extends outwardly away from the top of the conductive base. The modifying layer (16) is uniformly distributed and coated onto at least the surface of the other end of the carbon nanotube. The work function of the modifying layer is lower than that of the carbon nanotube.

8 Claims, 4 Drawing Sheets

FIELD EMISSION ELECTRON SOURCE HAVING CARBON NANOTUBE

RELATED APPLICATIONS

This application is related to commonly-assigned applications entitled, "METHODS FOR MAKING FIELD EMISSION ELECTRON SOURCE HAVING CARBON NANOTUBE", filed Sep. 1, 2006 application Ser. No. 11/514,583, and "FIELD EMISSION ELECTRON SOURCE HAVING CARBON NANOTUBE AND MANUFACTURING METHOD THEREOF", filed Sep. 1, 2006 application Ser. No. 11/514,595, the contents of each of which are hereby incorporated by reference thereto.

BACKGROUND

1. Field of the Invention

The invention relates generally to field emission electron sources and, more particularly, to a field emission electron sources employing a carbon nanotube.

2. Discussion of Related Art

Carbon nanotubes (also herein referred to as CNTs) are very small tube-shaped structures essentially having a composition of a graphite sheet in a tubular form. Carbon nanotubes have interesting and potentially useful electrical and mechanical properties and offer potential for various uses in electronic devices. Carbon nanotubes also feature extremely high electrical conductivity, very small diameters (much less than 100 nanometers), large aspect ratios (i.e. length/diameter ratios) (greater than 1000), and a tip-surface area near the theoretical limit (the smaller the tip-surface area, the more concentrated the electric field, and the greater the field enhancement factor). These features tend to make carbon nanotubes ideal candidates for field emission electron sources.

Generally, a cnt field emission electron source includes a conductive base and a carbon nanotube formed on the conductive base. The carbon nanotube acts as an emitter of the field emission electron source. The methods adopted for forming the carbon nanotube on the conductive base mainly include mechanical methods and in-situ synthesis methods. One mechanical method is performed by placing a synthesized carbon nanotube on a conductive base by an Atomic force microscope (AFM) and then fixing the carbon nanotube on the conductive base via a conductive paste or other adhesive. The mechanical method is relatively easy to carry out. However, the precision and efficiency thereof are relatively low. Furthermore, the electrical connection between the conductive base and the carbon nanotube tends to be poor because of the limitations of the conductive pastes used therebetween. Thus, the field emission characteristics of the carbon nanotube are generally unsatisfactory.

One in-situ synthesis method is performed by coating metal catalysts on a conductive base and synthesizing a carbon nanotube on the conductive base directly by means of chemical vapor deposition (CVD). The in-situ synthesis method is relatively easily performed. Furthermore, the electrical connection between the conductive base and the carbon nanotube is typically good because of the direct engagement therebetween. However, the mechanical connection between the carbon nanotube and the conductive base often is relatively weak and thus tends to be unreliable. Thus, in use, such a carbon nanotube is apt, after a period of time, to break away from the conductive base due to the stress of the electric field force. Such breakage would damage the field emission electron source and/or decrease its performance. Furthermore, in the in-situ synthesis method, control of the growth direction of the carbon nanotube is difficult to achieve during the synthesis process. Thus, the production efficiency thereof is relatively low, and the controllability thereof is less than desired. Still furthermore, the in-situ synthesis method has a relatively high cost.

Additionally, in order for the field emission electron source to successfully emit electrons, the emitter (i.e., the CNT) must have an ability to carry a large current. According to the Fowler-Nordheim equation, the field emitting current of the field emission electron source is determined by the electric field applied thereto and the work function of the emitter. Under the same electric field, the smaller the work function of the emitter (i.e., the lower the energy needed to free an electron therefrom), the bigger the field emitting current of the field emission electron source. However, the work function of carbon nanotubes is 4.55 electron volt. This is merely equal to tungsten. Thus, in use, the work function of a typical carbon nanotube is relatively high. As such, the work function of carbon nanotubes could limit the field emitting current of the field emission electron source.

What is needed, therefore, is a field emission electron source which has a firm mechanical connection and good electrical connection between the carbon nanotube and the conductive base and which thus tends to have satisfactory field emission characteristics and which has an emitter with a low work function.

SUMMARY

In one embodiment, a field emission electron source includes a conductive base, a carbon nanotube, and a modifying layer. The conductive base includes a top. The carbon nanotube includes a first end and a second end. The first end of the carbon nanotube is electrically and mechanically connected with the top of the conductive base. The second end of the carbon nanotube extends outwardly away from the top of the conductive base. The modifying layer is uniformly distributed and soaked (i.e., penetrated/permeated) into at least the second end of the carbon nanotube. The work function of the modifying layer is lower than that of the carbon nanotube.

Other advantages and novel features of the present field emission electron source will become more apparent from the following detailed description of preferred embodiments when taken in conjunction with the accompanying drawings.

BRIEF DESCRIPTION OF THE DRAWINGS

Many aspects of the present field emission electron source can be better understood with reference to the following drawings. The components in the drawings are not necessarily to scale, the emphasis instead being placed upon clearly illustrating the principles of the present field emission electron source.

Figure 1:
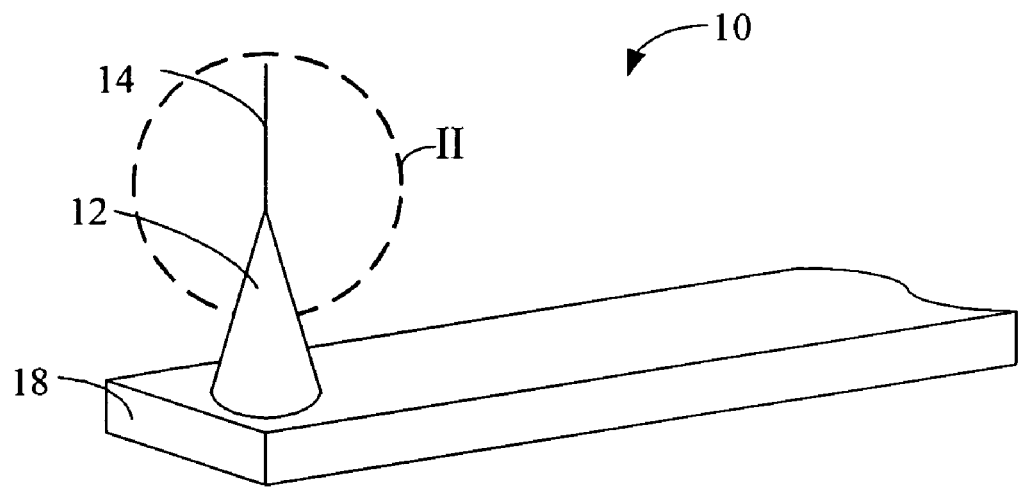
FIG. 1 is an isometric view of a field emission electron source, in accordance with an exemplary embodiment of the present device, the field emission electron source incorporating a carbon nanotube.

Corresponding reference characters indicate corresponding parts throughout the several views. The exemplifications set out herein illustrate at least one preferred embodiment of the present field emission electron source, in one form, and such exemplifications are not to be construed as limiting the scope of the invention in any manner.

DETAILED DESCRIPTION OF PREFERRED EMBODIMENTS

Reference will now be made to the drawings to describe embodiments of the present field emission electron source and the related manufacturing method, in detail.

Figure 2:
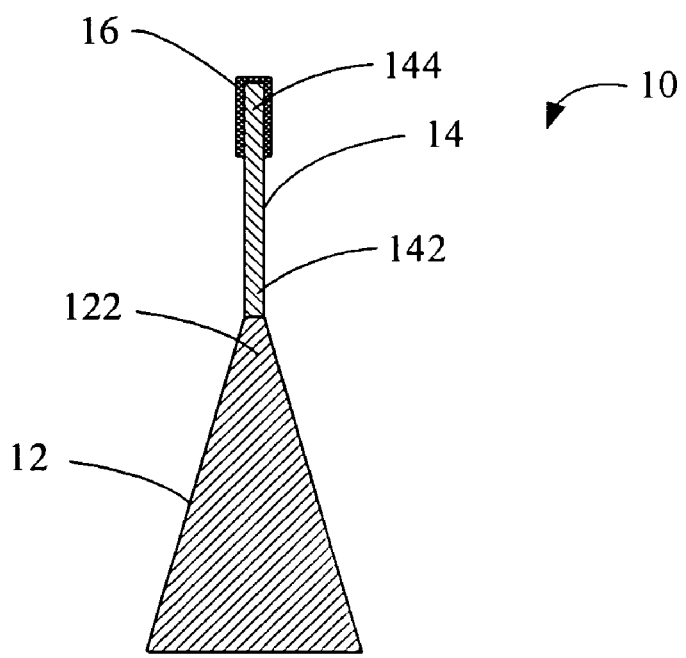
FIG. 2 is a longitudinal sectional view of the field emission electron source of section II of FIG. 1.

FIG. 1 is an isometric view of a field emission electron source 10, in accordance with an exemplary embodiment of the present device, and FIG. 2 is a longitudinal, sectional view of the upper portion of the field emission electron source 10 of FIG. 1. As shown in FIGS. 1 and 2, the field emission electron source 10 includes a conductive base 12, a carbon nanotube 14, and a modifying layer 16. The conductive base 12 includes a tapered top 122. A first end 142 of the carbon nanotube 14 is electrically connected with the tapered top 122 of the conductive base 12. The first end 142 is initially mechanically attached directly to the top 122 of conductive base 12 via van der Waals attractions therebetween. A second end 144 of the carbon nanotube 14 extends outwardly away from the top 122 of the conductive base 12 (i.e., essentially co-linear or at least essentially parallel with a center line of the conductive base 12). The modifying layer 16 is advantageously coated onto at least the surface of the second end 144 of the carbon nanotube 14, advantageously at least partially penetrating/soaking thereinto. The modifying layer 16 is made of a material (e.g., a carbide of Ti or Zr; or lanthanum hexaboride) having lower work function than the carbon nanotube 14. Preferably, this material also bonds well with carbon to promote a long lifetime for the device 10. This layer 16 can decrease the work function of the field emission electron source 10 and, thus, enhance the field emitting current of the field emission electron source 10. Accordingly, the modifying layer 16 can facilitate a sufficient use of the field emission characteristics of the carbon nanotube 14.

The conductive base 12 is advantageously made of a high-melting, oxidation resistant conductive material, preferably comprised of a metal selected from a group consisting of tungsten, gold, molybdenum, and platinum. Most preferably, due to the requirement of measuring expediency, the conductive base 12 is a probe of atomic force microscope with a film of gold formed thereon or is at least capable of being used as such a probe. The carbon nanotube 14 can be single-walled or multi-walled. Preferably, the carbon nanotube 14 is multi-walled. A diameter of the carbon nanotube 14 is approximately in the range from 1 to 50 nanometers, and a length thereof is about in the range from 10 to 100 micrometers. Preferably, the diameter of the carbon nanotube 14 is 15 nanometers, and the length thereof is 50 micrometers.

The modifying layer 16 is advantageously made of a material selected from a group consisting of titanium carbide, zirconium carbide, and lanthanum hexaboride, thus allowing for a work function at the tip of the carbon nanotube to be less than about 4 electron volt. Such a work function is a significant upgrade over that of the carbon nanotube alone (4.55 electron volt). In particular, a work function of titanium carbide is 3.82 electron volt, a work function of zirconium carbide is 3.32 electron volt, and a work function of lanthanum hexaboride is about 2.62 electron volt. A thickness of the modifying layer 16 is in the range of about from 1 to 10 nanometers. Preferably, the thickness of the modifying layer 16 is 5 nanometers. Alternatively, the modifying layer 16 can be made of lanthanum. Because the work function of the modifying layer 16 is lower than the carbon nanotube 14, based on the Fowler-Nordheim equation, the field emitting current of the field emission source 10 displays a marked increased, even when acted upon by a same electrical field, relative to an emitter lacking such a modifying layer 16. The maximum of the field emitting current of the field emission electron source 10, when using one of the carbide materials, is 100 microamperes, and, at the same time, the field emitting current density is $5.7 \times 10^7$ A/cm$^2$. The field emission current emitted by the field emission electron source 10 adopting lanthanum hexaboride as the modifying layer 16 can reach 140 microamperes, and, at the same time, the field emitting current density thereof can reach $7.9 \times 10^7$ A/cm$^2$. Most preferably, the field emitting current of the field emission electron source 10 is about in the range from 45 to 65 microamperes. The field emission electron source 10 can emit electrons without weakening for fifty thousand seconds in this range of current, thus indicating that the working life of the field emission electron source 10 should prove to be long.

It is can be understood that the top 122 of the conductive base 12 can, e.g., be tapered, cone-shaped, or column-shaped. The modifying layer 16 can further be formed on about the entire surface of the carbon nanotube 14 and, possibly, on at least the portion of the carbon nanotube 14 adjacent the top 122 of the conductive base 12. The field emission electron source 10 can be applied in a variety of field emission devices, such as a flat field emission display, electron gun, microwave amplifier, X-ray source, electron beam lithographic device, and so on.

Figure 3:
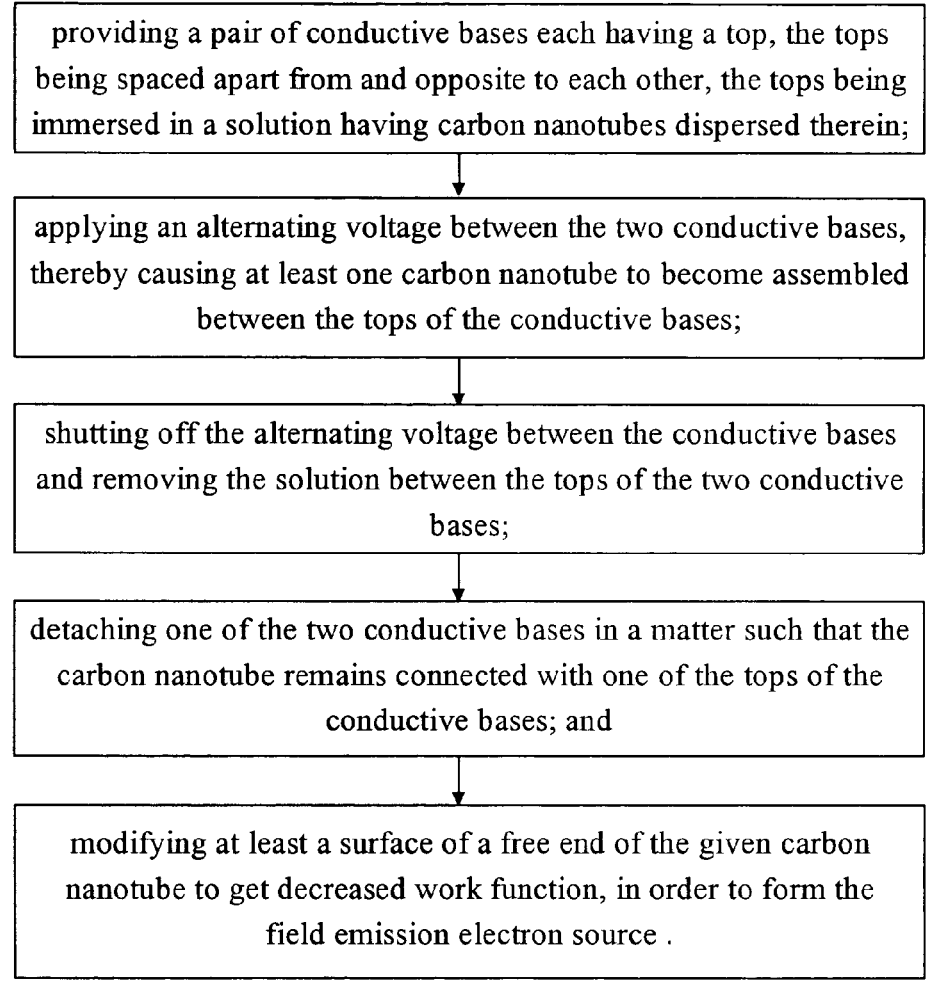
FIG. 3 is a flow chart showing a method for manufacturing the field emission electron source of FIG. 1.
Figure 4:
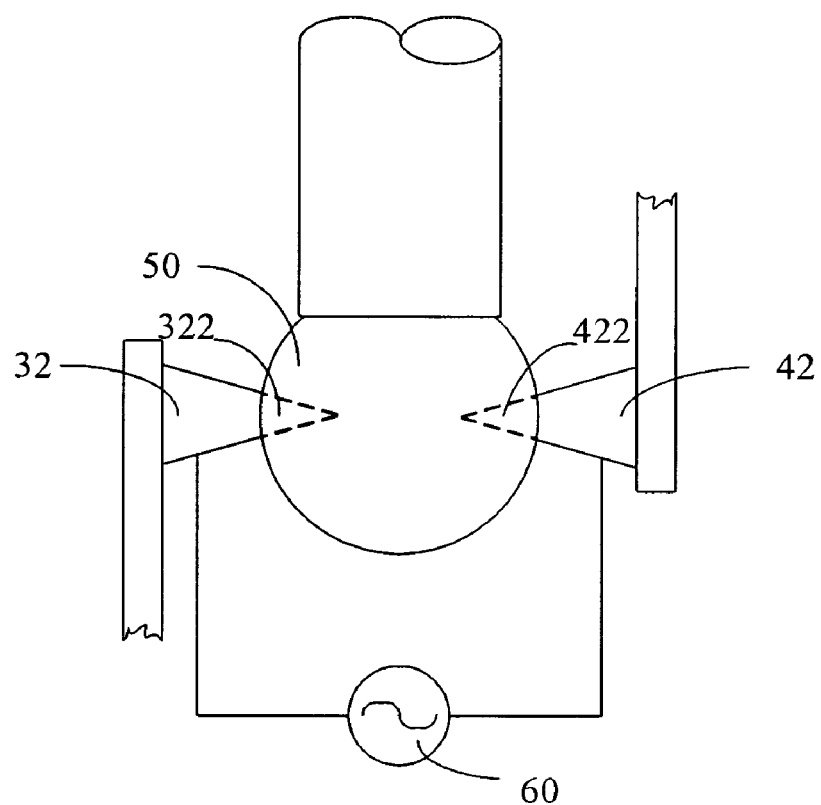
FIG. 4 is a schematic, side view of a device adapted for manufacturing the field emission electron source of FIG. 1.

Referring to FIGS. 3 and 4, a method for manufacturing the field emission electron source 10 includes the following steps:

step (a), providing a pair of conductive bases 32, 42, each having a tapered top 322, 422, the tapered top 322, 422 being spaced apart from and opposite to each other, the respective tapered tops 322, 422 being immersed in a solution 50 having carbon nanotubes 14 dispersed therein;

step (b), applying a voltage 60 between the two conductive bases 32, 42, thereby at least one carbon nanotube 14 being assembled between the tapered top 322, 422 of the conductive bases 32, 42, a current thereby being formed between the conductive bases 32, 42 upon connection of at least one carbon nanotube 14 to both such conductive bases 32, 42;

step (c), shutting off the current between the conductive bases 32, 42 and removing the solution 50 between the tapered tops 322, 422 of the two conductive bases 32, 42;

step (d), detaching one of the two conductive bases 32, 42, a given carbon nanotube 14 resultingly being connected with at least one tapered top 322, 422 of the conductive bases 32, 42; and step (e), modifying at least a surface of a free end of the given carbon nanotube 14 to get a decreased work function, in order to form the field emission electron source 10.

In the preferred embodiment, the conductive bases 32, 42 are advantageously adapted from a probe of an Atomic Force Microscope with a film of gold formed thereon. Alternatively, the conductive bases 32, 42 can be made of an oxidation-resistant conductive material, such as tungsten, gold, molybdenum, or platinum. The tops 322, 422 can be, e.g., tapered, cone-shaped or column-shaped. If the tops 322, 422 each have flat top surfaces, the tops 322, 422 should be arranged with parts of the top surfaces facing each other, for example, edges of the top surfaces facing each other. A distance between the tops 322, 422 is determined by a length of the carbon nanotubes 14 dispersed in the solution 50. Preferably, the distance between the top 322, 422 is similar to the length of the carbon nanotube, in order to facilitate the assembly process. Generally, the distance is smaller than about 100 micrometers. Preferably, the distance is in the range from 10 to 20 micrometers.

The solution 50, beneficially, includes isopropanol, which is used as the main solvent, and ethyl cellulose, which is used as the stabilizer. The carbon nanotubes 14 are uniformly dispersed in the solution 50 by means of ultrasonic oscillation, the solution 50 and carbon nanotubes 14 together comprising a suspension. It is can be understood that the solution 50 could be prepared by utilizing other similar suitable main solvents and/or stabilizers. Furthermore, other treating steps such as filtrating could be used to obtain the stable uniform solution 50. In the preferred embodiment, the carbon nanotubes 14 are multi-walled and made by a method of Low Pressure Chemical Vapor Deposition. It is recognized that the higher the concentration of the carbon nanotubes 14 in the solution 50, the greater the numbers of the carbon nanotubes 14 that may be connected between the tops 322, 422. Thus, the numbers of the carbon nanotubes 14 that is to be subsequently connected between the tops 322, 422 can be controlled by adjusting the concentration of the carbon nanotubes 14 in the solution 50. If, for example, only one carbon nanotube 14 is desired to connect between the tops 322, 422, the concentration of the carbon nanotubes 14 in the solution 50 should be as low as possible and still allow for nanotube attachment within a desired time frame.

The solution 50 can be provided into and/or removed from the volume proximate the tops 322, 422 of the conductive bases 32, 42 by, e.g., straws, pipettes, injectors and so on. The volume of the solution 50 should not be too large, so as to not overly minimize the opportunity of interaction between the carbon nanotubes 14 carried thereby and the tops 322, 422. It is suitable that both the tops 322, 422 can be sufficiently immersed in the solution 50. Alternatively, the suitable solution 50 can be put in a container, such as a beaker, and the tops 322, 422 of the conductive bases 32, 42 can be directly immersed in/covered with the solution 50. When the solution 50 needs to be separated from the tops 322, 422, the tops 322, 422 are removed out of the solution 50 directly.

In step (b), the voltage 60 is preferably an A.C. (alternating current) voltage. The A.C. voltage 60 advantageously has a peak value of about 10 volts or less and has a frequency in the range from about 1000 Hz to about 10 MHz. Generally, the A.C. voltage 60 could be applied for a time period in the range from about several seconds to several tens of seconds, until at least one of the carbon nanotubes 14 is connected to at least one of the tops 322, 422. That is, the method takes relatively little time, and enables a high manufacturing efficiency to be attained. It is further to be noted that even if a given carbon nanotube 14 attaches to only one of the tops 322, 422 in this process, it will still tend to align toward the opposing one of the tops 322, 422, due to the opposite polarity associated therewith. This tendency to align based on polarity actually helps ensure that a given carbon nanotube 14 will indeed be substantially perpendicular to its respective conductive base 32, 42.

More specifically, the present method essentially operates based on the principle of double-directional electrophoresis. Once the A.C. voltage 60 is applied between the conductive bases 32, 42, an A. C. electrical field is correspondingly established between the tops 322, 422 of the conductive bases 32, 42. The carbon nanotubes 14 in the solution 50 are then forced to move toward a direction along which the electrical field intensity increases. Accordingly, the carbon nanotubes tend to extend/align toward the opposing tops 322, 422, between which the electrical field intensity is the highest. Eventually, at least one carbon nanotube 14 may be connected to at least one of the tops 322, 422, thus extending between, if not connected, to both tops 322, 422. By the present method, the carbon nanotube 14 can be firmly secured between the tops 322, 422 via Van der Waals attractions therebetween.

In the step (d), the conductive bases 32, 42 are moved along opposite directions by a steady foreign force and separate from each other gradually. Such movement ultimately causes the carbon nanotube 14 to detach from at least one of the conductive bases 32, 42 (preferably just detaching from one of the conductive bases 32, 42, in order to potentially yield the desired nanotube/base combination). Due to the different lengths of the two ends of the carbon nanotube 14 being attached on the bases 32, 42, respectively, after the detaching process, the carbon nanotube 14 would generally be attached on the top of one conductive base 32, 42. Preferably, the shorter the length/amount of an end of the carbon nanotube 14 that is attached on/to a given base 32, 42, the easier that end of the carbon nanotube 14 is detached from the given base 32, 42. It is to be understood that it is difficult to control the length of the ends of the carbon nanotube 14 that becomes attached on the respective conductive bases 32, 42. As such, the carbon nanotube 14 is randomly attached to the one of the tapered tops 322, 422 of the conductive bases 32, 42. The steps from (a) to (d) can be repeated until the carbon nanotube 14 is attached to the predetermined conductive base, in a desired location thereon.

In the step (e), the modifying of the surface of the carbon nanotube 14 further includes the steps as follows. Firstly, the surface of the carbon nanotube 14 is pretreated by forming a film of metal on at least the surface of the free end of the carbon nanotube 14. The film of metal is made of a material that has a low work function, has high melting point, and, essentially, is readily coated on the surface of the carbon nanotube 14. Preferably, the film of metal is made of a material selected from a group consisting of titanium and zirconium. The film of metal is formed on at least the free end of the carbon nanotube 14 by means, for example, of magnetron sputtering or electron beam evaporation. A thickness of the film of metal is in the approximate range from 1 to 10 nanometers. At a minimum the film of metal needs to be formed on the free end of the carbon nanotube 14 in order to help promote electron emission therefrom. Preferably, the film of metal is formed on nearly the entire surface of the carbon nanotube and, yet more preferably, nearly the entire surface of top of the corresponding conductive base to which the carbon nanotube is attached, as well. Formed to this extent, the film of metal not only promotes an increase in electron emission but also helps bond the carbon nanotube 14 to the corresponding base and can improve the electrical conductance therebetween. The film of metal beneficially is formed by means of magnetron sputtering and has a thickness of about 5 nanometers.

Secondly, the carbon nanotube 14 having the film of metal formed thereon is further treated by applying an increased voltage to the field emission electron source in a vacuum environment, thereby causing the carbon nanotube 14 of the field emission electron source to emit electrons. This emission ensures that the film of metal formed on the surface of the carbon nanotube 14 is carbonized by chemical reaction and a modifying layer 16 is formed. Due to the emitting of electrons, the modifying of the surface of the carbon nanotube is finished. It is to be understood that the time of the emission needs to be controlled in the range from thirty minutes to two hours to make the film of metal carbonize entirely and to avoid reducing the life of the carbon nanotube 14. Preferably, the time of the emission is thirty minutes, and a film of titanium carbide or zirconium carbide is formed on the surface of the carbon nanotube 14. As such, the modifying layer is formed, permeating into the surface of the carbon nanotube 14. This modifying process decreases the work function of the field emission electron source 10 and maintains a sufficient use of the geometrical characteristics (i.e., nearly a point source at the tip, the modifying layer 16 not adding significantly to the diameter thereat) of the carbon nanotube 14 needed for achieving good field emission. The thickness of the carbonized layer is approximately the same as that of the original metal film.

When the modifying layer 16 is formed of lanthanum hexaboride or lanthanum, the modifying layer 16 is, as with the metal carbide versions, formed at least on the free end of the carbon nanotube by means of magnetron sputtering or electron beam evaporation, except no subsequent carbonization step is required, which is a variance upon step (e) above. Beyond that, the desired features (e.g., extent of modifying layer 16, deposition thickness, etc.) are generally the same as for when TiC and/or ZrC are used for the modifying layer 16. A thickness of such a modifying layer 16 is in the range from 1 to 10 nanometers, with a preferred thickness of 5 nanometers.

It is also to be understood that, in step (b), an inspecting device can be adopted to inspect and control the assembling process. For instance, in the illustrated embodiment, a resistor (not shown) can be connected in series with the conductive bases 32, 42, and an oscillograph (not shown), in turn, can be connected in parallel with the resistor. When the carbon nanotube 14 is not connected between the tops of the conductive bases 32, 42, the conductive bases 32, 42 are in open circuit. In this state, there is no current flowing through the resistor. When the carbon nanotube 14 is connected between the tops of the conductive bases 32, 42, the conductive bases 32, 42 are in closed circuit. In this state, there is a current flowing through the resistor. Therefore, the oscillograph displays a change of the wave of the resistor. At this time, the voltage 60 can be switched off and the solution 50 can be then removed from the tops 322, 422 of the conductive bases 32, 42. Therefore, the whole assembling process could realize an automatic operation and inspection. The precision, efficiency, and controllability associated therewith are manifestly improved. It should be understood that other inspecting means could be utilized for inspecting and controlling the assembling step, and it is not limited to the illustrated embodiment.

It is also to be understood that a field emission array including a plurality of field emission electron sources 10 can be manufactured, as follows. Firstly, a cathode layer, having a plurality of first conductive bases formed thereon, is directly immersed in the solution carrying carbon nanotubes. Secondly, a voltage is applied between a movable second conductive base and one of the first conductive bases, and thereby at least one carbon nanotube becomes assembled between the tops of the first and second conductive bases, respectively. Thirdly, the movably second conductive base is moved toward another first conductive base to dislodge the second conductive base from the carbon nanotube, and the second step is repeated, thereby at least one carbon nanotube being assembled yet again between the tops of the first and second conductive bases. The third step is repeated yet again, and thereby the carbon nanotubes are assembled with the first conductive bases, respectively. Finally, a modifying layer is formed on at least the surfaces of the free ends of the carbon nanotubes, respectively, in order to form the field emission array.

Figure 5:
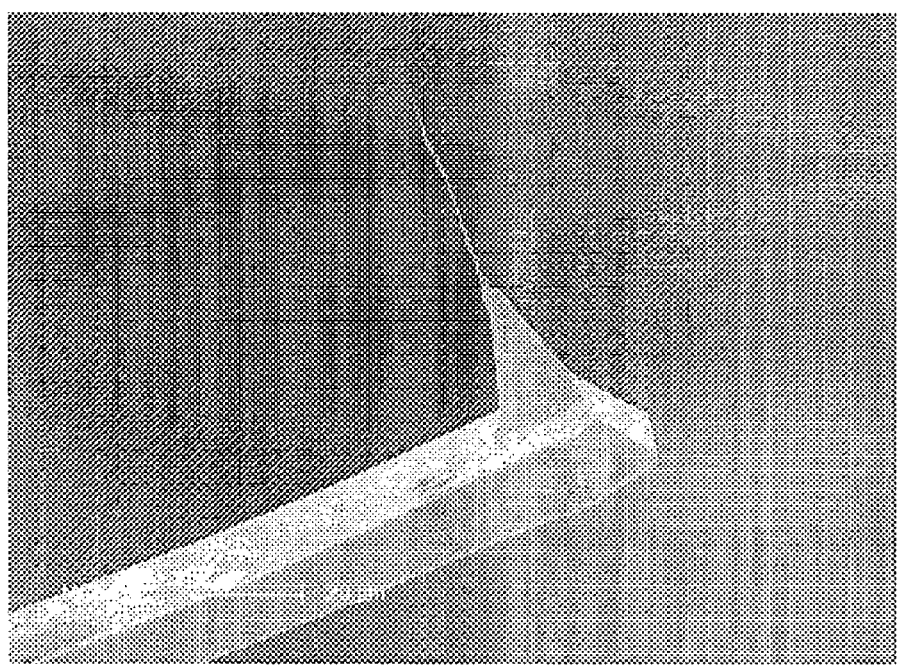
FIG. 5 is a Scanning Electron Microscope (SEM) image of the field emission electron source of FIG. 1.

FIG. 5 is a Scanning Electron Microscope (SEM) image of the field emission electron source 10 of FIG. 1. As shown in FIG. 5, a carbon nanotube is assembled with a top of one conductive base and is aligned to be substantially straight along a longitudinal direction thereof. This alignment occurs because the carbon nanotube is polarized by the electrical field during the assembling process, due to the opposing electrical charges at the two respective ends thereof. During the movement of the carbon nanotube toward the respective tops of the conductive bases, the electrical field exerts a force to opposite ends of the carbon nanotube, resulting in the desired alignment.

Figure 6:
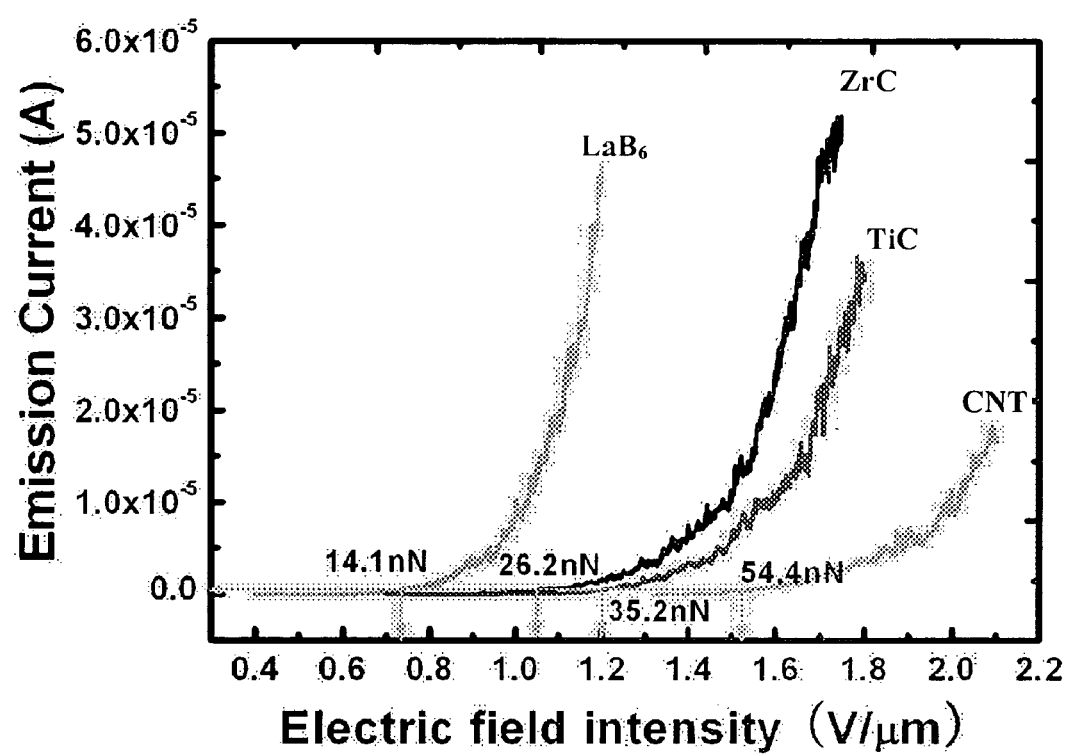
FIG. 6 is a series of current-voltage curves for CNT-based field emission electron sources, untreated and modified.

FIG. 6 is a series of plots of current versus voltage curve for three types of the field emission electron source 10 of FIG. 1 and a source similar to that, without a modifying layer 16 (i.e., a plain carbon nanotube). As shown in FIG. 6, the modifying layers 16 of this example are made of titanium carbide (TiC), zirconium carbide (ZrC), and lanthanum hexaboride ($LaB_6$), respectively. The turn-on electric field intensity of the field emission electron source modified by titanium carbide is about 1.2 V/$\mu$m (voltage/micrometer), the turn-on electric field intensity of the field emission electron source modified by zirconium carbide is about 1.05 V/$\mu$m, and the turn-on electric field intensity of the field emission electron source modified by lanthanum hexaboride is about 0.7 V/$\mu$m. All these turn-on electric filed intensities are lower than that of the field emission electron source without such a modification (i.e., about 1.5 V/$\mu$m for a plain carbon nanotube otherwise mounted in the same manner). The field emission current of the present field emission electron sources, as modified by the presence of the titanium carbide, zirconium carbide or lanthanum hexaboride, is enhanced obviously, relative to a carbon nanotube without such a modifying layer at the free end thereof. Furthermore, the extract force induced by the filed emission electron sources modified by titanium carbide is about 35.2 nN (nanoNewton), the extract force induced by the field emission electron sources modified by zirconium carbide is about 26.2 nN, and the extract force induced by the filed emission electron sources modified by lanthanum hexaboride is about 14.1 nN. All these extract forces are lower than that induced by the field emission electron source without modification (i.e., about 54.4 nN). Therefore, the mechanical connection between the carbon nanotube and the conductive base is firm, and the electrical connection therebetween is sufficient.

The field emission electron source of the present device has a modifying layer formed thereon. This layer, if allowed to extend beyond the tip of the carbon nanotube, along the length thereof, and ultimately onto the conductive base, can enhance the mechanical connection between the carbon nanotube and the conductive base and can usually reduce the contact resistance therebetween. The layer is formed on the surface of the carbon nanotube. The modifying layer can also facilitate a sufficient use of the geometric characteristics (i.e., the near point source size of the nanotube tip) of the carbon nanotube needed to promote good emission therefrom. Further, the modifying layer can decrease the work function of the carbon nanotube and, thus, increase the field emitting current of the field emission electron source accordingly. The present method for manufacturing the present field emission electron source could be instituted as part of an automatic operation and inspection. The precision, efficiency, and controllability associated therewith are manifestly improved. Furthermore, since the relative manufacturing device is simple, the production cost is generally low. It is suitable for mass production of the field emission electron source.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

We claim:

1. A field emission electron source comprising:
   a conductive base having a top;
   a carbon nanotube having a first end and a second end, the first end being electrically and mechanically connected with the top of the conductive base, the second end extending outwardly away from the top of the conductive base; and
   a modifying layer being uniformly distributed and coated onto at least the second end of the carbon nanotube, at least part of the modifying layer penetrating the second end, the work function of the modifying layer being lower than that of the carbon nanotube;
   wherein the top is a tapered;
   wherein there is only one carbon nanotube, the carbon nanotube is electrically connected to the tapered top of the conductive base and is co-linear with a center line of the conductive base.

2. The field emission electron source as claimed in claim 1, wherein the modifying layer is comprised of a material selected from a group consisting of titanium carbide, zirconium carbide, lanthanum hexaboride, and lanthanum.

3. The field emission electron source as claimed in claim 2, wherein the work function of titanium carbide, zirconium carbide, and lanthanum hexaboride is 3.32 electron volt, 3.86 electron volt, and 2.62 electron volt, respectively.

4. The field emission electron source as claimed in claim 1, wherein a thickness of the modifying layer is in the range from about 1 to about 10 nanometers.

5. The field emission electron source as claimed in claim 1, wherein the conductive base is comprised of a material selected from a group consisting of tungsten, gold, molybdenum arid platinum.

6. The field emission electron source as claimed in claim 1, wherein the conductive base is at least capable of being a probe of an atomic force microscope, the conductive base having a film of gold formed thereon.

7. The field emission electron source as claimed in claim 1, wherein at least one such the carbon nanotube is multi-walled.

8. The field emission electron source as claimed in claim 1, wherein a length of the carbon nanotube is about in the range from 10 to 100 micrometers, and a diameter of the carbon nanotube is approximately in the range from 1 to 50 nanometers.

* * * * *